United States Patent
Gozdz

(12) 
(10) Patent No.: US 6,337,101 B1
(45) Date of Patent: Jan. 8, 2002

(54) METHOD OF TREATING SEPARATOR FOR USE IN ELECTROCHEMICAL CELL DEVICES

(75) Inventor: Antoni S. Gozdz, Ocean Township, Monmouth County, NJ (US)

(73) Assignee: Valence Technology (Nevada), Inc., Henderson, NV (US)

( * ) Notice: Subject to any disclaimer, the term of this patent is extended or adjusted under 35 U.S.C. 154(b) by 0 days.

(21) Appl. No.: 09/447,641

(22) Filed: Nov. 23, 1999

(51) Int. Cl.$^7$ ............................. B05D 3/02; B05D 5/12

(52) U.S. Cl. ..................... 427/58; 427/340; 427/384

(58) Field of Search ................... 427/340, 58, 384

(56) References Cited

U.S. PATENT DOCUMENTS

| | | | | |
|---|---|---|---|---|
| 4,210,998 A | * | 7/1980 | Gaunt | 427/284 |
| 5,296,318 A | * | 3/1994 | Gozdz et al. | 429/192 |
| 5,460,904 A | * | 10/1995 | Gozdz et al. | 429/192 |
| 5,571,634 A | * | 11/1996 | Gozdz et al. | 429/192 |
| 5,639,573 A | * | 6/1997 | Oliver et al. | 429/190 |
| 5,665,265 A | * | 9/1997 | Gies et al. | 252/62.2 |
| 5,681,357 A | * | 10/1997 | Eschbach et al. | 429/192 |
| 6,024,773 A | * | 2/2000 | Inuzuka et al. | 29/623.4 |

FOREIGN PATENT DOCUMENTS

EP          933824      *  8/1999

OTHER PUBLICATIONS

Hawley's Condensed Chemical Dictionary, Twelfth Edition, 1993, p. 970, 1993.*

* cited by examiner

Primary Examiner—Erma Cameron
(74) Attorney, Agent, or Firm—Harness, Dickey & Pierce, P.L.C.

(57) ABSTRACT

A method for treating a separator for use in laminated multi-layer electrochemical cell device structures. The devices comprise positive and negative electrode layer members of polymeric matrix composition having the microporous polyolefin membrane separator member interposed therebetween wherein the separator membrane includes a polymer coating layer. The separator is treated to provide a deposited coating of a primary plasticizer for the polymer coating layer. The device electrode and separator members are then assembled and laminated at a compressive force and temperature at which the plasticizer film softens the polymer coating of the separator member sufficiently to establish a strong interfacial bond with the matrix polymers of the electrode members and thereby form a laminated unitary cell structure. In another embodiment, the primary plasticizer comprises a component of the electrode polymeric matrix compositions. In either embodiment, the plasticizer subsequently volatilizes from the structure to further strengthen the interfacial bond, yet its temporary presence in the interfacial region of the multi-layer cell structure enables lamination of the cell members at a temperature below the pore-collapse temperature of the separator membrane, thereby preserving the thermal shut-down protection feature of the microporous separator.

14 Claims, 1 Drawing Sheet

METHOD OF TREATING SEPARATOR FOR USE IN ELECTROCHEMICAL CELL DEVICES

BACKGROUND OF THE INVENTION

The present invention generally relates to a method of treating a separator for use in making bonded multi-layer, flat-plate electrochemical cell devices, such as rechargeable batteries and supercapacitors. More specifically, the invention describes a method of treating a separator for use in establishing persistent interfacial bonding between laminated planar electrode and the separator utilized in such electrochemical devices wherein the bonding is acieved at a low-temperature.

Widely deployed primary and secondary, rechargeable lithium-ion battery cells are typical of electrochemical devices to which the present invention is directed. Such cells comprise layers, or membranes, of respective positive and negative electrode compositions assembled with a coextensive interposed layer, or membrane, of electrically-insulating, ion-transmissive separator material. This multi-layer battery cell structure is normally packaged with a mobile-ion electrolyte composition, usually in fluid state and situated in part in the separator membrane, in order to ensure essential ionic conductivity between the electrode membranes during charge and discharge cycles of the battery cell.

One type of separator for this purpose is a microporous polyolefin membrane, either of single- or multi-layer structure, described, for example, in U.S. Pat. Nos. 5,565, 281 and 5,667,911. When employed as rechargeable battery cell separators, these porous membranes not only effectively retain within their porous structure the essential fluid cell electrolyte compositions, but they also provide an additional advantage in that they possess an automatic cell "shut-down" feature that prevents uncontrolled heat buildup within the battery cell which might otherwise result, for instance during excessive cell recharging, in a dangerous explosive condition. This built-in safety mechanism occurs because the melting point range of the polyolefins utilized in the fabrication of the separator membranes is at the lower end of the danger zone of battery cell heat buildup. Thus, in the event of a run-away cell heating episode, the porous polyolefin separator membrane becomes heated to a point of melting and its pore structure collapses, thereby interrupting the essential ionic conductivity within the cell and terminating the electrochemical reaction before a dangerous condition ensues.

The packaging of battery cell structures has heretofore regularly taken the form of a metal "can", whether, for example, in elongated tubular or flattened prismatic shape, which has commonly been relied upon to not only contain the electrolyte component, but also to impart the significant stack pressure required to maintain close physical contact between the individual cell electrodes and the interposed separator member. This intimate contact, along with the composition of the electrolyte, is, as previously noted, essential to efficient ion transmission between electrodes during operation of the battery cell.

More recently, however, the profusion and continued miniaturization of electronic devices powered by Li-ion batteries and similar energy storage cells has generated a demand for a greater number of cell package shapes and dimensions, e.g., relatively broad, yet thin, lightweight packages having a significant degree of flexibility. For example, numerous end-use applications make thin, flexible envelope-style packages of polymer film more desirable than the prior rigid-walled high-pressure can containers. However, these more flexible packages are decreasingly capable of achieving and maintaining the substantial physical pressures required to ensure the noted essential intimate inter-layer contact throughout the battery cell.

In order to minimize the deleterious effect of degraded physical stack pressure previously relied upon to establish the necessary contact between cell layers, developers have progressed to the use of direct laminated adhesive bonding between electrode and separator layers to ensure their essential intimate contact. Typical of such innovations are battery cells utilizing polymer-based layer members, such as described in U.S. Pat. Nos. 5,456,000 and 5,460,904. In those fabrications, polymer compositions, preferably of poly (vinylidene fluoride) copolymers, which are compatible with efficient fluid electrolyte compositions are utilized in the physical matrix of both the electrode and the separator members to not only promote essential ionic conductivity, but also to provide a common composition component in those cell members which promotes strong interfacial adhesion between them within a reasonably low laminating temperature range. Such laminated, multilayer polymeric battery cells operate effectively with stable, high-capacity performance even though packaged in flexible, lightweight polymeric film enclosures.

Although such laminated battery cells, and like energy storage devices, have significantly advanced the art in miniaturized applications, the use of substantially non-porous polymeric matrices and membranes in their fabrication has deprived these devices of the desirable shut-down feature achieved when using the microporous polyolefin separator membranes. However, the high surface energy exhibited by the polyolefin membranes renders them highly abherent in nature and thus prevents their strong, permanent adhesion to electrode layer compositions, particularly within a reasonable temperature range which does not lead to melting or thermal collapse of the porous structure of the polyolefin membranes.

Some attempts have been made by electrochemical cell fabricators to combine, by simple solution overcoating or extrusion, the shut-down properties of porous separator membranes with the laminate adhesive properties of polymer compositions, for example, as described in U.S. Pat. Nos. 5,837,015 and 5,853,916. However, it has generally been found that the overcoating compositions significantly occlude or otherwise interfere with the porous structure of the polyolefin membranes and cause a deleterious decrease in electrolyte mobility and ionic conductivity. Further, the addition of substantial amounts of overcoating materials, increases the proportion of non-reactive components in a cell, thereby detracting from the specific capacity of any resulting energy storage device.

As an alternative approach to enabling the incorporation of microporous separator membranes into a laminated electrochemical cell structure, an attempt to modify the surface of the polyolefin membrane by application of a minimal layer of polymer composition has been made.

The polymer composition would not be of such excessive thickness as to occlude the porosity of the membrane, but rather would provide an intermediate transition in compatibility to the matrix polymer of preferred electrode cell layer compositions. Thus, for example, a thin layer from a dilute solution of poly(vinylidene fluoride) copolymer is applied to the microporous separator membrane when the membrane is intended to be employed in the fabrication of a battery cell by thermal lamination with electrodes comprising active compositions of a similar polymer. This modification has proven to be insufficient in itself to enable satisfactory interfacial bonding between cell component layers at lamination temperatures below the critical level which results in collapse of separator porosity and its attendant loss of effective ionic conductivity and desirable shut-down capability.

Therefore, there remains a need in the art to provide improved surface-modified microporous separator membranes for use in high-capacity, shut-down protected laminated electrochemical cells.

SUMMARY OF THE INVENTION

The present invention provides a method of treating surface-modified microporous separator membranes so that such membranes can be effectively used in electrochemical cells.

More particularly, the present invention comprises a method for facilitating the lamination of electrochemical cells at laminating temperatures which effect firm interfacial bonding between electrode and separator layers, yet are sufficiently low to avoid thermal collapse or other occlusion of the porous structure of the separator membranes, through the use of surface-modified microporous polyolefin separator membranes which have been treated in accordance with the present invention. The method of the present invention helps prevent loss of essential ionic conductivity and maintains thermal shut-down capability.

In general, the method of the present invention comprises initially applying to a surface-modified separator membrane a dilute solution of a primary plasticizer for the surface-modifying, polymeric membrane coating in a volatile organic solvent, and removing the volatile solvent, such as by evaporation in air, to deposit the plasticizer in the pores of the separator. The cell is further processed by applying an electrode to each surface of the surface-modified separator membrane; applying a moderate amount of heat and pressure to the multi-layer assembly to affect bonding; and removing any residual plasticizer from the assembly by heat and/or reduced pressure.

The treatment solution is preferably made up of about 10% to 30% of the plasticizer, and more preferably about 15% to 20% plasticizer. Useful plasticizers are moderately volatile and include alkylene carbonates, dialkyl phthalates, dialkyl succinates, dialkyl adipates, dialkyl sebacates, trialkyl phosphates, polyalkylene glycol ethers and mixtures thereof. The organic solvent is selected to be significantly more volatile than the plasticizer and to exhibit limited solvency toward the surface-modifying polymer of the separator membrane. Lower alcohols, ketones, esters, aliphatic hydrocarbons, halogenated solvents, chlorinated hydrocarbons, chlorinated fluorocarbons, and mixtures thereof are all useful. A sufficient amount of the plasticizer solution is applied to the membrane to ensure some significant intake of the solution within the pores of the membrane. The treatment solution may be applied by any appropriate method, such as coating, immersion or spraying.

Electrode membranes may be in the form of highly densified polymeric electrodes deposited on metal-foil current collectors, such as those used in liquid-electrolyte Li-ion cells, and/or densified and non-extracted and/or extracted plastic Li-ion electrodes such as those disclosed in U.S. Pat. Nos. 5,418,091; 5,429,891; 5,456,000; 5,460,904; 5,540,741; 5,571,634; 5,587,253; 5,607,485; wherein preferably at least one electrode has a reticulated metal current collector in the form of an expanded-metal grid, mesh, metallic non-woven material, etched foil or perforated foil.

Following application of the plasticizer/solvent solution, the volatile solvent is removed, such as by evaporation, which results in the deposition of the plasticizer superficially on the surface and in the pores of the separator membrane. The coated separator membrane is thereafter assembled in the usual manner between positive and negative electrode layers or membranes and the assemblage is laminated, e.g., between heated pressure rollers, at a temperature and pressure which does not significantly effect the porous structure; i.e. a temperature below the shutdown temperature, of the separator membrane. For example, lamination may be carried out between 70° C. and 120° C., and preferably between 90° C. and 110° C., and more preferably at about 100° C., and with a linear load between 10 and 40 pounds per linear inch (lb/in) and more preferably between 20 and 30 lb/in. Advantageously, when processed in these temperature and pressure ranges, the deposited plasticizer now resident in and about the porous separator membrane exhibits its solvency toward and softens the surface-modifying polymer of the separator membrane, as well as the contiguous surface of the compatible electrode matrix polymer, and a close adhesive/ cohesive bond is formed between the electrode and separator membrane interfaces.

A minor amount of plasticizer insufficient to disrupt the modifying polymer layer may reside on the surface of the membrane at the outset of the lamination operation, however, a greater amount is forced from the pores of the separator membrane under the pressure of lamination and provides sufficient softening of the polymer interfaces to effect a deep intermingling of the surface polymers of the electrode and separator membranes. Subsequent to the lamination, and influenced by the slowly dissipating heat of the laminating operation, the remaining plasticizer volatilizes to promote a strong, unsoftened polymer bond at the electrode and separator membrane interfaces.

In and alternative embodiment of the present invention, the moderately volatile primary plasticizer is included in the electrode polymer matrix composition and is available from that source at the electrode and separator membrane interface to act upon the polymer layer of the separator membrane during the laminating operation.

BRIEF DESCRIPTION OF THE DRAWING

The present invention will be described with reference to the accompanying drawing of which.

DESCRIPTION OF THE INVENTION

Figure 1:
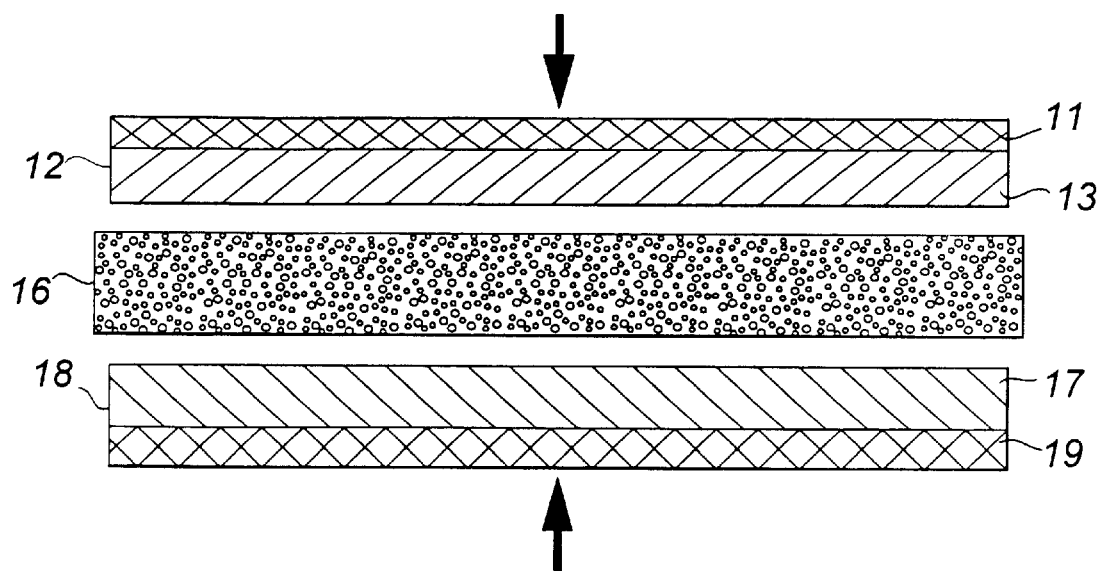
FIG. 1 is a cross-sectional view of an assemblage of electrochemical cell members according to one embodiment of the present invention, including a surface-modified microporous separator member, in the process of being laminated.

As shown in FIG. 1, the fabrication of a laminated electrochemical cell typically comprises assembling a separator membrane or layer member 16, between a first electrode member 12, and a second electrode member 18, of opposite polarity to that of the first electrode member 12, and applying heat and pressure in the direction of the arrows to soften the polymeric electrode and separator compositions and bring the member interfaces into intimate bonding contact to form a unitary, bonded laminate cell structure. The respective electrodes 12, 18, are often first formed as individual subassemblies by coating or laminating electrode composition layers 13, 17, upon respective conductive current collector members 11, 19, such as metallic foils or reticulated grids. It is preferred that at least one collector member comprise a reticulated grid to facilitate later fluid fabrication operations, e.g., solvent or evaporative removal of electrode composition plasticizer and insertion of electrolyte solution.

In particular, the composite electrodes appropriate for use in electrochemical cells according to the present invention may be fabricated by first dissolving a polymeric binder material in an appropriate solvent, adding powdered positive or negative electrode material and an electronically conductive additive, then homogenizing the components to obtain a smooth, homogeneous paste, and casting such paste on a carrier substrate, a metallic foil, or reticulated current collector by any number of methods, such as meter bar or doctor-blade casting, die extrusion, screen printing, transfer coating, and the like. In another variation, a non-volatile plasticizer of said polymeric binder may also be included in the casting preparation as a processing aid. After the volatile casting solvent is removed by evaporation, the electrode composition is mechanically compacted and bonded to the appropriate metallic collector by calendering, pressing, or lamination at elevated pressure and temperature conditions.

Figure 2:
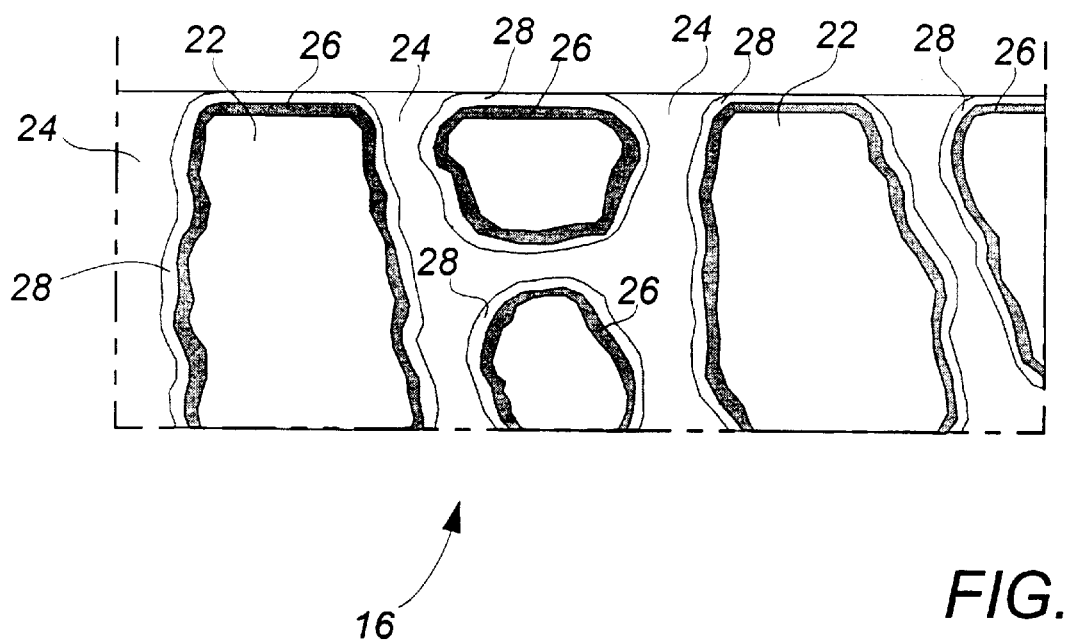
FIG. 2 is an enlarged cross-sectional view of a segment of the microporous separator member of FIG. 1, depicting in greater detail an embodiment of the present invention.

In the present invention, the separator member 16, is a commercial microporous polyolefin membrane, such as marketed by Celgard LLC under the trademark, Celgard, which has been modified by the manufacturer to add a surface coating of polymer, e.g., a poly(vinylidene fluoride) copolymer, which forms a thin coating of such polymer in and about the surfaces of the myriad pores of the membrane structure, as shown in FIG. 2. The separator membrane 16, comprises a body portion 22, of polyolefin structure having pores 24, dispersed throughout that ultimately contain electrolyte and establish the essential ionic conductivity within the electrochemical cell, while also providing the heat-collapsible shut-down safety feature of the cell. The separator membrane 16, is modified by providing a coated film 26, of modifying polymer selected to have compatibility with the preferred polymeric matrix materials utilized in the cell electrode membranes. This modification is intended by the manufacturer to enhance the ability of the polyolefin membrane to adhere to cell electrode layers, however, this modification has been found to be unsuitable in many applications to enable a firm interfacial bond with electrode membranes by a process of thermal lamination at temperatures which are sufficiently low to avoid collapse of the porous structure of the separator membrane and ultimate disruption of the desirable battery cell shut-down feature.

The present invention overcomes the shortcomings noted above. In particular, in accordance with one embodiment of the present invention, the modified membrane is treated with a dilute solution of about 10% to 30% of a moderately volatile plasticizer in an inorganic solver, wherein the plasticizer is a primary plasticizer for the modifying polymer of the separator membrane. The treated membrane is then dried to remove the organic solvent and deposit a layer 28, of the plasticizer on the surfaces of the modifying polymer film 26. A microporous separator membrane treated in this manner may then be assembled with any of numerous common polymeric electrode layers or membranes, such as shown in FIG. 1, and laminated with heat and pressure in readily available commercial devices.

Because of the in situ plasticizing effect of locally-deposited plasticizer in layer 28, a laminating temperature well below the normal softening point of the separator polyolefin body will be sufficient to establish the desired permanent bond between electrodes and separator without endangering the porous structure of the separator membrane. The moderate volatility of the deposited plasticizer enables its dissipation from the laminate bond site over time with a resulting strengthening of the adhesive bond.

The effective concentration of plasticizer in the membrane-coating solution may be readily varied depending upon the specific membrane-modifying and electrode matrix polymers in the cell fabrication in order to deposit the minimal optimum amount of plasticizer sufficient to promote the adhesive/cohesive softening of the contiguous surfaces of the modifying polymer of the separator membrane and electrode matrix polymers at temperatures safely below the flow temperature of the polyolefin body of the separator membrane. The selection of a particular plasticizer solution composition is well within the normal abilities of cell fabrication technicians.

In the alternative embodiment of the present invention, wherein the plasticizer is included in the electrode polymer matrix composition, the optimum proportion of plasticizer to be incorporated in the electrode matrix composition is also within the skill of the cell fabrication technician.

The following examples are illustrative of the processes used in accordance with the present invention and provide guidance to the selection of useful combinations of ingredients and compositions for effective practice of the present invention. However, other embodiments will be clear to the skilled artisan and certainly within the ability of the skilled cell fabrication technician.

EXAMPLE 1

Preparation of Plastic Cathode 74 g of commercial-grade $LiCoO_2$, 8 g of poly(vinylidene fluoride)-hexafluoropropylene (PVdF-HFP) copolymer (Kynar PowerFLEX LBG, Elf Atochem), 5 g of Super P conductive carbon (MMM, Belgium), 13 g of dibutyl phthalate (DBP, Aldrich), and 150 ml acetone were homogenized and heated in a hermetically closed vessel for 1 hour at 45° C. After additional homogenization in a laboratory blender, the resulting paste was cast on a polyester carrier film using a doctor blade apparatus gapped at about 0.3 mm. The acetone was evaporated in a stream of warm air and the resulting self-supporting film was removed from the carrier. A section of the film was used as a positive electrode membrane and was laminated with a similarly sized section of aluminum expanded metal grid (MicroGrid, Delker Corp.) using a heated double-roll laminator at a temperature of about 145° C. In an ancillary operation often employed to enhance the absorption of electrolyte solution, the DBP plasticizer was extracted from the electrode membrane with hexanes at room temperature and the resulting positive electrode member was air-dried at about 70° C.

In an alternative embodiment, two electrode films formed by the above process were laminated on opposite surfaces of the aluminum grid using the laminating process described above, to create a positive electrode structure having an embedded aluminum collector layer.

A further alternative positive electrode member useful with the present invention and typical of such members comprising many current commercial battery cells was similarly prepared from a composition of 90 g of $LiCoO_2$, 5 g of poly(vinylidene fluoride) homopolymer (Kynar 741, Elf Atochem), 5 g of Super P carbon, and 60 ml of N-methyl pyrrolidone. The resulting paste was coated on 0.03 mm aluminum foil at about 0.3 mm, dried in heated air, and the resulting coated foil calendered to about 0.1 mm thickness to form a positive electrode member. This electrode alternative provided substantially the same physical and electrochemical results when substituted for the foregoing electrode member in the following examples.

EXAMPLE 2

Preparation of Plastic Anode 70 g of MCMB 25–28 microbead mesophase artificial graphite (Osaka Gas Co., Japan), 8 g of PvdF-HFP copolymer (Kynar PowerFLEX LBG, Elf Atochem), 4 g of Super P conductive carbon (MMM, Belgium), 18 g of DBP plasticizer, and 150 ml of acetone was processed as set forth in Example 1. A section of the formed electrode membrane was laminated with a similarly sized section of copper expanded metal grid (MicroGrid, Delker Corp.) using a heated double-roll laminator at a temperature of about 145° C. The DBP plasticizer was extracted in the manner of Example 1 and the resulting negative electrode member was air-dried at about 70° C.

In an alternative embodiment, the copper grid may be embedded between two electrode membranes or coated with an electrode paste in the same manner as described in Example 1.

EXAMPLE 3

Preparation of Coated Polyolefin Separator Membrane

A commercial three-layer, 25 μm microporous polyolefin separator membrane material which had been surface-modified by the manufacturer (Celgard LLC) with a proprietary poly(vinylidene fluoride) copolymer composition coating was treated according to an embodiment of the present invention in the following manner to prepare an electrochemical cell separator member. A section of separator membrane cut slightly larger in lateral dimensions than electrode members of Examples 1 and 2 to ensure complete electrical insulation between those members was immersed for a few seconds in a 15% solution of propylene carbonate (PC) in methanol and then removed to allow excess solution to drip from the sample. The originally opaque membrane appeared translucent, indicating impregnation of the solution into the pores of the membrane. The sample was then allowed to air-dry for several minutes during which the methanol vehicle evaporated, depositing the residual PC on the surfaces of the pores of the membrane without compromising the porous membrane structure, as was indicated by a reversion to membrane opacity approaching that of the original membrane.

EXAMPLE 4

Assembly of Battery Cell

A functional laminated rechargeable electrochemical battery cell was prepared be assembling the cell members of Examples 1–3 as depicted in FIG. 1 and laminating the assemblage in a commercial heated opposed-roller laminator device at about 100° C. and 25 lb/in roll pressure. The laminate was placed in a circulating air oven at about 70° C. for 1 hour to remove moisture and residual PC and then packaged in an hermetically sealed multi-layer foil/polymer envelope in a helium atmosphere with a measure of activating 1 M solution of $LiPF_6$ in an equipart mixture of ethylene carbonate:dimethyl carbonate (EC:DMC). The cell was then connected to a battery cycler and tested under various conditions of common usage employing a CCCV charging protocol (charge at a C/2 rate to an upper cutoff voltage of 4.2 V followed by a 2 hour constant-voltage holding period at 4.2 V) and a CC (C/5) constant-current discharge. The battery cell exhibited highly responsive performance and a remarkably stable capacity over extended cycles. At the conclusion of the period of cycle testing, the packaged battery cell was contacted with a heated platen to quickly raise its temperature to about 160° C., a temperature in excess of the designed polyolefin softening shut-down temperature of the separator membrane. The current output of the battery rapidly ceased at a cell temperature of about 135° C., indicating that microporous structure of the cell was sustained during the laminating operation.

EXAMPLE 5

Assembly of Battery Cell

As a counter-example of the efficacy of the present invention, electrode member samples prepared in the manner of Examples 1 and 2 were assembled, laminated, and formed into a battery cell in the manner and under the conditions of Example 4 with a section of the commercial surface-modified microporous separator membrane employed in Example 3, but lacking the plasticizer solution treatment of that example. The lamination adhesion between the cell member layers was sufficient to allow careful handling of the laminate cell structure during the final packaging operation; however, it was apparent that the layers could be readily separated at the interfaces without undue effort. Such inadequate interfacial bonding, resulted in the performance of the battery cell fluctuating significantly during charge/discharge cycling and cell capacity diminishing noticeably over numerous cycles.

EXAMPLE 6

Comparative Bond Strength

In an attempt to quantify the efficacy of the foregoing plasticizer treatment in terms of comparative interfacial bond strengths developed during lamination at sub-shutdown temperature, e.g., as between the laminates according to Examples 4 and 5, the laminate cell structures of those examples were duplicated, but for the lack of laminating pressure in the region of the trailing ends of the assemblages in order to provide unadhered sections of individual cell member layers which would serve as access tabs for the ensuing peel strength testing. Each of the cell samples was thereafter mounted in an Instron tensile strength test device such that individual electrode/separator membrane lamination couples were clamped at their access tabs in the device. Each peel strength test was conducted at room temperature under a constant applied strain rate of 200% per minute. In response to the applied strain of the tests, the untreated sample according to Example 5 registered no substantial interfacial bond strength, rather both the positive electrode/separator and negative electrode/separator interfaces readily separated without significant disfigurement of either surface, thus indicating minimal bond strength between those cell members.

On the other hand, under identical peel test conditions, the interface couples of the Example 4 sample prepared after treatment according to the above-described embodiment of the present invention registered substantial bond strength in the Instron device. This data was inconclusive in determining the electrode/separator interfacial bond strength, because in each instance bond failure occurred not at that interface, but within the body of the respective electrode composition layers. The electrode/separator interfacial bond effected by the present invention thus indeed exceeds the strength of the individual electrode composition layers.

EXAMPLE 7

Preparation of Electrodes

For the fabrication of a laminated battery cell according to another embodiment of the present invention, positive and negative electrode members were prepared as in Examples 1 and 2 with the exceptions that propylene carbonate (PC) was substituted for dibutyl phthalate (DBP) as the polymer matrix plasticizer, and the ancillary plasticizer extraction operation was not employed. The resulting electrode membranes comprised about 15% PC plasticizer.

EXAMPLE 8

Assembly of Battery Cell

The electrode members of Example 7 were laminated with a surface-modified separator membrane and further used to prepare a battery cell in the manner of Example 5. However, contrary to the results of tests obtained with the laminated cell structure of Example 5, the present structure performed substantially the same, as to both strong interfacial laminate bonding and desirable electrochemical cell characteristics, as that of Example 4.

EXAMPLE 9

Assembly of Battery Cell

As an example of the comparative efficacy of plasticizer compounds in the present invention, electrode members of Examples 1 and 2 were prepared, but not subjected to the ancillary extraction operation. Laminated cell structures and battery cell samples were prepared with these electrode members according to Example 8 and tests were conducted in like manner. The test results were marginally satisfactory in substantially all aspects, evidencing the preferred performance of a plasticizer, such as PC, which exhibits a more aggressive solvency, or plasticizing capability, with respect to the surface-modifying polymer of the microporous separator membrane.

EXAMPLE 10

Comparative Lamination Tests

Respective exemplary embodiments of the present invention were used to fabricate a number of laminated battery cells in the manner of foregoing Examples 4 and 8. The conditions of lamination were varied from about 80° C. to 110° C. and about 10 to 30 lb/in roller pressure with substantially similar results in both separator interfacial bonding and electrochemical cell performance.

EXAMPLE 11

Comparative Plasticizer Tests

A number of battery cell were prepared in the manner of Example 4, i.e. using the cell members of Examples 1–3, except that the separator membrane materials were treated with solutions of PC in methanol varying from about 10% to 30% PC. Test results, as in the previous example, varied little within commercially acceptable ranges.

Numerous additional laminated battery cells were considered comprising various compositions of other outlined plasticizer solutes, such as, butylene carbonate, dimethyl phthalate, diethyl phthalate, dipropyl phthalate, dibutyl phthalate, dimethyl ethers of diethylene glycol, dimethyl ethers of triethylene glycol, dimethyl succinate, diethyl succinate, dibutyl succinate, dimethyl adipate, diethyl adipate, dimethyl sebacate, and mixtures thereof. Of those, the compositions comprising dimethyl ethers of diethylene glycol, and dimethyl ethers of triethylene glycol, in addition to the exemplary propylene carbonate, would be particularly preferred due to their more vigorous plasticizing capability.

In the microporous membrane-treating embodiment of the invention, there may be employed, instead of the exemplary methanol, a number of other useful solvent vehicles, such as, acetone, methyl ethyl ketone, ethanol, n-propanol, isopropanol, methyl acetate, ethyl acetate, methyl propionate, dimethyl carbonate, methylene chloride, chloroform, dichloroethane, trichloroethylene, higher-boiling chlorofluorocarbons, and mixtures thereof. While such other components have been seen to provide substantially similar results in the preparation of microporous membrane-treating compositions, their preferential selection may depend on a number of ancillary considerations, such as, for example, desired solvent evaporation time and speed of processing, maintenance of safe environments, and robustness of processing equipment and conditions.

For instance, while the use of acetone as a treatment solution vehicle would promote more rapid evaporation and shorter processing lines, the lower solvency of methanol would minimize a tendency toward affecting the configuration or uniformity of the surface-modifying polymers of the polyolefin separator membrane material, thus leading to a preference for the methanol solvent. This is also the case for other solvents of lesser solvency, such as, ethanol, n-propanol, isopropanol, dichloroethane, and trichloroethylene. Other considerations such as corrosiveness, commercial availability, cost, toxicity, flammability, and reactivity in electrochemical environs would similarly bear weight in selection of final components.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. A method of treating a separator for use in multi-layer electrochemical devices, said method comprising:
   providing a surface modified microporous separator having a polymer coating layer;
   providing a solution including a primary plasticizer of said polymer coating layer and a solvent;
   treating said separator with said solution; and
   removing said solvent to deposit said plasticizer on said polymer coating layer.

2. A method according to claim 1, wherein said solvent has a higher volatility than that of said plasticizer.

3. A method according to claim 1, wherein said step of removing comprises evaporating said solvent.

4. A method according to claim 1, wherein said solution comprises about 10% to 30% of plasticizer and about 90% to 70% solvent.

5. A method according to claim 4, wherein said solution comprises about 15% to 20% of plasticizer and about 85% to 80% solvent.

6. A method according to claim 1, wherein said polymer coating layer comprises a poly(vinylidene fluoride) copolymer.

7. A method according to claim 1, wherein said plasticizer is selected from the group consisting of alkylene carbonates, dialkyl phthalates, dialkyl adipates, dialkyl succinates, trialkyl phosphates, polyalkylene glycol ethers, dialkyl sebacates and mixtures thereof.

8. A method according to claim 7, wherein said plasticizer is selected from the group consisting of propylene carbonate, butylene carbonate, dimethyl ethers of diethylene glycol, dimethyl ethers of triethylene glycol, dimethyl phthalate, diethyl phthalate, dipropyl phthalate, dibutyl phthalate, dimethyl succinate, diethyl succinate, dibutyl succinate, dimethyl adipate, diethyl adipate, dimethyl sebacate and mixtures thereof.

9. A method according to claim 8, wherein said plasticizer is selected from the group consisting of propylene carbonate, dimethyl ethers of diethylene glycol, dimethyl ethers of triethylene glycol and mixtures thereof.

10. A method according to claim 1, wherein said solvent is selected from the group consisting of lower alcohols, ketones, esters, aliphatic hydrocarbons, halogenated solvents, chlorinated hydrocarbons, chlorinated fluorocarbons and mixtures thereof.

11. A method according to claim 10, wherein said solvent is selected from the group consisting of methanol, acetone, methyl ethyl ketone, ethanol, n-propanol, isopropanol, methyl acetate, ethyl acetate, methyl propionate, dimethyl carbonate, methylene chloride, chloroform, dichloroethane, trichloroethylene, higher-boiling chlorofluorocarbons and mixtures thereof.

12. A method according to claim 11, wherein said solvent is selected from the group consisting of methanol, ethanol, n-propanol, isopropanol, dichloroethane, trichloroethylene and mixtures thereof.

13. A method according to claim 1, wherein said solution comprises about 15% propylene carbonate in about 85% methanol.

14. A method according to claim 1, wherein said separator comprises a microporous polyolefin seprator.

* * * * *